United States Patent Office

3,773,912
Patented Nov. 20, 1973

3,773,912
ANTIPOLLUTION DISPOSAL OF SOUR REFINERY
GAS WITH SULFUR RECOVERY
Carl David Spangler, Jr., 2400 Mockingbird Lane,
Ponca City, Okla. 74601
No Drawing. Filed Dec. 10, 1970, Ser. No. 97,039
Int. Cl. C01b 17/02; C01c 3/00
U.S. Cl. 423—574         6 Claims

ABSTRACT OF THE DISCLOSURE

A gaseous stream comprising hydrogen sulfide and ammonia is passed over a catalyst comprising iron or both cobalt and molybdenum to convert the ammonia to hydrogen and nitrogen and then is passed to a Claus type sulfur recovery process wherein hydrogen sulfide is converted to sulfur. Optionally, the stream, subsequent to the dissociation of the ammonia, is passed to an amine absorber, and the hydrogen sulfide regenerated from the amine is then passed to a Claus type sulfur recovery process. Atmospheric pollution from sulfur compounds and nitrogen oxides is abated.

BACKGROUND OF THE INVENTION

This invention relates to abatement of atmospheric pollution by recovery of sulfur from gaseous streams containing hydrogen sulfide and ammonia.

Virtually all refineries have sour water streams in which ammonia, hydrogen sulfide, phenols, and trace amounts of hydrocarbons are dissolved in water as a result of refining processes. Such sour water streams would pollute the aqueous environment if discharged into streams or the like. Present practice is normally to steam strip such sour water streams, which purifies the water but which then produces a waste gas stream comprised largely of ammonia, hydrogen sulfide, steam, phenols, and trace quantities of hydrocarbons which must then be disposed of. Such a waste gas stream is sometimes vented to the atmosphere. This, however, contributes to atmospheric pollution. Often, present practice is to incinerate such a waste gas stream. However, in highly industrailized areas this is often still undesirable because of the resulting atmospheric pollution with sulfur dioxide and nitrogen oxides formed as combustion products. Furthermore, valuable sulfur is lost as sulfur dioxide.

Claus type sulfur recovery processes are conventionally employed to recover sulfur from hydrogen sulfide containing gaseous streams derived from sour natural gas or refinery streams which do not also contain ammonia (Kirk-Othmer, Encylopedia of Chemical Technology, 2nd ed., vol. 19, pp. 352–354 and 386; Webb, "Production of Sulfur From Hydrogen Sulfide," Oil and Gas Journal, pp. 71 and 72, Jan. 11, 1951). Claus type sulfur recovery processes have proven to be very valuable in abating atmospheric pollution and in recovering valuable sulfur.

However, Claus type sulfur recovery processes have not proven satisfactory in recovering sulfur from hydrogen sulfide in gas streams which also contain ammonia. Complex compounds of ammonia, water, and hydrogen sulfide (very probably consisting largely of ammonium hydro sulfide, $NH_4HS$) are formed in the equipment of the Claus type sulfur recovery processes which then plug the equipment. Atmosphere polluting nitrogen oxides can still also be formed when the sulfur recovery process tail gas containing unconverted ammonia is incinerated. Clearly, a need exists for an improvement whereby the Claus type sulfur recovery processes can be employed to recover sulfur from sour refinery gas streams which contain hydrogen sulfide and also ammonia.

OBJECTS OF THE INVENTION

An object of this invention is to prevent atmospheric pollution with nitrogen oxides and/or sulfur dioxide.

A further object of this invention is to recover sulfur from a gaseous stream which comprises hydrogen sulfide and ammonia.

Various other objects and advantages will appear from the description of the invention, and the most novel features will be particularly pointed out hereinafter in connection with the appended claims.

SUMMARY OF THE INVENTION

According to my invention, gaseous streams comprising hydrogen sulfide and ammonia are contacted with a catalyst comprising iron or cobalt plus molybdenum to convert the ammonia to hydrogen and nitrogen before passing to a Claus type sulfur recovery process wherein sulfur is recovered by oxidation and reaction of the hydrogen sulfide.

DESCRIPTION OF THE PREFERRED EMBODIMENTS

According to a presently preferred embodiment, the gaseous stream subsequent to dissociation of the ammonia, supra, is passed to an amine absorber, and the hydrogen sulfide is regenerated from the amine prior to passing the resulting hydrogen sulfide containing stream which is free of ammonia to a Claus type sulfur recovery process.

The gaseous streams of this invention, which comprise hydrogen sulfide and ammonia, include any gaseous stream produced by steam stripping sour refinery water. Streams which are particularly benefited by dissociation of ammonia to hydrogen and nitrogen according to the process of the instant invention prior to passing to a Claus process generally contain in the range of about 5 to 50 weight percent of ammonia, 10 to 70 weight percent hydrogen sulfide, 0 to 1 weight percent phenols, 10 to 80 weight percent of water vapor, and 0 to 0.2 weight percent of hydrocarbons.

The catalyst of this invention which comprises an iron compound can contain in the range of about 1 to 20 weight percent of iron in the form of an inorganic iron compound. Examples of suitable iron compounds include iron oxide, iron sulfide, and iron salts such as phosphates, sulfates, halides, and the like. The remainder of the catalyst comprising an iron compound can be made up of various supports including one or more of the oxides of the elements, aluminum, zirconium, chromium, magnesium, calcium, and the like. Other supports such as silica, zeolites, and the like can also be employed, and mixtures are suitable. The particular type of support is not critical so long as it does not deleteriously affect the catalytic functioning of the iron compound and so long as it is stable in the reaction environment. Catalysts comprising in the range of 1 to 20 weight percent of iron as iron oxide, iron sulfide, or mixtures thereof on silica-alumina are presently particularly preferred.

The catalysts of this invention which comprise cobalt and molybdenum can contain in the range of 2 to 5 weight percent cobalt and in the range of 9 to 20 weight percent of molybdenum. The cobalt and molybdenum can be present as oxides, sulfides, phosphates, halides, or the like or can be present as cobalt-molybdate. Supports such as silica, alumina, zeolites, calcium oxide, magnesia, chromia, zirconia, and the like can be employed. Mixed cobalt-molybdenum compounds and supports can be employed. Presently particularly preferred is a cobalt-molybdate on alumina catalyst.

The ammonia dissociation reaction of the instant invention is normally carried out at temperatures in the range of about 1200 to 2000° F. Pressures in the range of from just subatmospheric to about 25 p.s.i.g. are often preferably employed. Flow rates generally in the range of about 100 to 2000 cubic feet of gas per hour per cubic foot of catalyst are suitable. The dissociation takes place in the gaseous phase.

Subsequent to dissociation, according to the instant invention, the resulting gas stream can be passed to a conventional Claus type sulfur recovery process to recover sulfur without the deleterious effects of ammonia.

According to one presently preferred embodiment, the gaseous effluent from the dissociation of the instant invention is passed to a conventional amine absorber, and the hydrogen sulfide containing stream regenerated from the amine is passed to a conventional Claus type sulfur recovery process. Operation and functioning of amine absorbers and strippers are thoroughly disclosed in Gas Conditioning Fact Book, pp. 145–234, Dow Chemical Company, Midland, Mich. (1962), and Kohl and Riesenfeld, Gas Purification, pp. 18–86, McGraw-Hill (1960).

The art clearly recognizes that hydrogen sulfide is not separated from ammonia by the amine absorption and stripping operation, however. Kohl and Riesenfeld, Gas Purification, p. 81, McGraw-Hill (1960), discloses that "when $NH_3$ is present most of its is dissolved in the ethanol amine solutions and expelled in the regeneration step." Therefore, amine absorption is not satisfactory for separating ammonia from hydrogen sulfide prior to sulfur recovery by the Claus process.

The Claus type sulfur recovery processes contemplated by this specification include all those conventional processes whereby $H_2S$ is converted to elemental sulfur by direct or indirect conversion with oxygen and recovered. Included are the so-called straight through, split flow, sulfur recycle, and direct oxidation processes, but the processes contemplated by the term "Claus type sulfur recovery process" are not limited to these named processes. Disclosure of conventional Claus type sulfur recovery processes is found in Kirk-Othmer, Encyclopedia of Chemical Technology, 2nd ed., vol. 19, pp. 352–354 and 386, and Webb, "Production of Sulfur From Hydrogen Sulfide," Oil and Gas Journal, pp. 71 and 72, Jan. 11, 1951.

The process of the instant invention is particularly advantageous from the standpoint of abatement of atmospheric pollution. Thus, hydrogen sulfide is converted into sulfur, a valuable item of commerce used in a wide variety of industrial processes. The nitrogen formed by the dissociation of ammonia naturally comprises a major portion of the atmosphere. The hydrogen formed by dissociation of ammonia is readily oxidized to water, another non-polluting, naturally occurring material in the environment.

EXAMPLES

Example 1

At atmospheric pressure, a gas mixture containing about 40 volume percent ammonia, 50 volume percent hydrogen sulfide, and 10 volume percent water was preheated to about 250° F. and passed through a preheater operated in the range of 300–350° F. to a reactor. The reactor contained 40 cc. of a Girdler G–47 [a] catalyst which had 1.9 weight percent iron as iron oxide on silica-alumina. The effluent gas stream was scrubbed by HCl and sodium hydroxide solutions to remove any unreacted ammonia and hydrogen sulfide. The particle size of the catalyst was in the range of 0.65 to 0.132 inch in diameter. The rate of gas flow at the inlet and the gas output flow was measured. Gas liquid chromatographic analysis of the effluent was made. A space velocity of 100 cubic feet of gas per cubic foot of catalyst per hour at various temperatures was employed with results as indicated in Table 1 following:

TABLE 1

| Reactor temperature, °F.: | Percent $NH_3$ conversion |
|---|---|
| 1292 | 13 |
| 1499 | 19 |
| 1661 | 47 |
| 1839 | 98 |

This example demonstrates dissociation of ammonia to nitrogen and hydrogen in the presence of $H_2S$ as promoted by a catalyst comprising an iron compound.

Example 2

About 40 cc. of catalyst was placed in a reactor tube, and the system was heated to about 392° F. Each catalyst was sulfided in the presence of pure hydrogen sulfide for at least two hours at 1292° F. A mixture comprising 29.7 volume percent hydrogen sulfide, 44.0 percent ammonia, and 26.3 volume percent water was then passed through the reactor. After the system had stabilized after about 30 minutes, gas liquid chromatography was run on the effluent gases, and conversions were determined. Data from a number of runs at different space velocities and reactor temperatures follow in Table 2. It was also determined that about 6 to 20 percent of the hydrogen sulfide present was dissociated into hydrogen and free sulfur in the presence of both catalysts.

TABLE 2

| Catalyst | Space velocity, ft.³/hr./ft.³ | Reactor temp., °F. | Percent of inlet ammonia converted [1] |
|---|---|---|---|
| Girdler G–47 (4.8% Fe) [2] | 100 | 1,292 | 7 |
| | 100 | 1,472 | 38 |
| | 100 | 1,652 | 92 |
| | 100 | 1,832 | 100 |
| | 500 | 1,292 | 1 |
| | 500 | 1,472 | 9 |
| | 500 | 1,652 | 39 |
| | 500 | 1,832 | 86 |
| Filtrol 475-8 [3] | 100 | 1,292 | 68 |
| | 100 | 1,472 | 82 |
| | 100 | 1,652 | 92 |
| | 100 | 1,832 | 97 |
| | 500 | 1,292 | 20 |
| | 500 | 1,472 | 29 |
| | 500 | 1,652 | 39 |
| | 500 | 1,832 | 49 |

[1] Assuming that only $NH_3$ is dissociated.
[2] Girdler G–47 is iron on silica-alumina, Girdler Catalyst Department, Chemetron Chemicals, Division of Chemetron Corp., P.O. Box 337, Louisville, Ky. 40201.
[3] Filtrol 475-8 is CoO and $MoO_3$ on alumina base, Filtrol Corp., 3250 East Washington Boulevard, Los Angeles, Calif. 90.023

This example demonstrates dissociation of ammonia to hydrogen and nitrogen in the presence of $H_2S$ as catalyzed by a catalyst of this invention comprising iron and as catalyzed by a catalyst of this invention comprising cobalt and molybdenum.

Example 3

Exemplary streams of refinery sour waters are steam stripped to yield gaseous streams comprising 10 to 70 weight percent $H_2S$, 5 to 50 weight percent $NH_3$, 10 to 80 weight percent $H_2O$ vapor, 0 to 1.0 weight percent phenols, and 0 to 0.2 weight percent hydrocarbons. Compositions of exemplary gaseous streams follow in Table 3.

TABLE 3

| | Weight percent | | | | |
|---|---|---|---|---|---|
| Stream: | $H_2S$ | $NH_3$ | $H_2O$ | Phenols | Hydrocarbons |
| 1 | 70 | 20 | 10 | 0 | 0 |
| 2 | 10 | 50 | 40 | 0 | 0 |
| 3 | 10 | 10 | 80 | 0 | 0 |
| 4 | 20 | 10 | 68.8 | 1.0 | 0.2 |
| 5 | 30 | 40 | 29 | 0.9 | 0.1 |
| 6 | 40 | 30 | 29 | 0.9 | 0.1 |

[a] Girdler G–47 is iron on silica-alumina, Girdler Catalyst Department, Chemetron Chemicals, Division of Chemetron Corp., P.O. Box 337, Louisville, Ky. 40201.

Each gaseous stream is passed through a catalyst comprising iron oxide on silica-alumina which contains 4.8 weight percent iron. The dissociation reactor temperature is 1800° F., and the space velocity is 100 cubic feet of gas per hour per cubic foot of catalyst. Pressure is atmospheric. After passage through the dissociation reactor, the $NH_3$ in each stream is essentially all converted to $H_2$ and $N_2$. Approximately 7 volume percent of the $H_2S$ is also convtrted to $H_2$ and elemental sulfur.

Each effluent stream from the dissociation reactor is then passed to a Claus type sulfur recovery system wherein the $H_2S$ is converted to elemental sulfur and water vapor. The $H_2$ in the stream is also converted to $H_2O$ upon reaction with $O_2$. The gas effluent upon separation of the sulfur is incinerated and passed to the atmosphere. Analysis of the gas passed to the atmosphere reveals only $CO_2$, $H_2O$, and $N_2$ in significant quantities. All of these substances are natural components of the atmosphere. No atmospheric pollution is effected. The sulfur is recovered.

I claim:
1. In a process for the recovery of sulfur from a gaseous stream containing hydrogen sulfide by a Claus type sulfur recovery process, the improvement comprising prior to passing a stream containing ammonia, water and hydrogen sulfide to said Claus type sulfur recovery process contacting said gaseous stream at a temperature in the range of about 1200–1800° F. with a catalyst consisting of a compound selected from iron oxide, iron sulfide, iron phosphate, iron sulfate, and iron halide and mixtures thereof on a suitable support said compound containing about 1–20 weight percent iron said contacting converting ammonia to nitrogen and hydrogen in the presence of hydrogen sulfide and then passing the resulting gaseous stream to a Claus type sulfur recovery process.

2. In a process for the recovery of sulfur from a gaseous stream containing hydrogen sulfide by a Claus type sulfur recovery process, the improvement comprising prior to passing a stream containing ammonia, water and hydrogen sulfide to said Claus type sulfur recovery process contacting said gaseous stream with a catalyst consisting of a metal selected from cobalt molybdate, cobalt oxide, cobalt sulfide, cobalt phosphate, cobalt halide, molybdenum sulfide, molybdenum oxide, molybdenum phosphate, and molybdenum halide and combinations thereof on a suitable support wherein cobalt concentration is in the range of about 2–5 weight percent and molybdenum concentration is in the range of about 9–20 weight percent said contacting converting the ammonia to nitrogen and hydrogen and the passing the resulting gaseous stream to a Claus type sulfur recovery process.

3. A process of claim 1 wherein the support is selected from silica-alumina and alumina; the gas hourly space velocity is in the range of about 100–2000 cubic feet per hour per cubic foot; and the gaseous stream is derived by steam stripping a sour refinery water and contains about 5–50 weight percent ammonia, about 10–70 weight percent hydrogen sulfide, about 0–1 weight percent phenols, and about 0–0.2 weight percent hydrocarbons.

4. A process of claim 2 wherein the support is selected from silica-alumina and alumina; the gas hourly space velocity is in the range of about 100–2000 cubic feet per hour per cubic foot; the temperature is in the range of about 1200–2000° F.; and the gaseous stream is derived by steam stripping a sour refinery water and contains about 5–50 weight percent ammonia, about 10–20 weight percent hydrogen sulfide, about 0–1 weight percent phenols and about 0–0.2 weight percent hydrocarbons.

5. A process of claim 1 wherein the gaseous stream following contacting with catalyst and prior to conversion of hydrogen sulfide is purified by passing the gaseous stream through an amine absorber.

6. A process of claim 2 wherein the gaseous stream following contacting with catalyst and prior to conversion of hydrogen sulfide is purified by passing the gaseous stream through an amine absorber.

References Cited
UNITED STATES PATENTS

| | | | |
|---|---|---|---|
| 3,404,099 | 10/1968 | Steinmetz | 423—362 XLR |
| 3,424,809 | 1/1969 | Johnston | 252—470 XLR |
| 3,403,975 | 10/1968 | Frilette et al. | 23—220 XLR |
| 3,467,491 | 9/1969 | Hardison | 23—220 XLR |
| 3,186,789 | 6/1965 | Ward et al. | 23—210 XLR |

OTHER REFERENCES

| | | | |
|---|---|---|---|
| 686,469 | 1/1953 | Great Britain | 23—225 P |

OTHER REFERENCES

Emmett (editor): Catalysis, vol. III, p. 240 (Reinhold, 1955).

Bond: Catalysis by Metals, p. 375 (Academic Press, 1962).

OSCAR R. VERTIZ, Primary Examiner

G. A. HELLER, Assistant Examiner

U.S. Cl. X.R.
423—222, 237, 351